US008666329B2

(12) United States Patent
Mitomo et al.

(10) Patent No.: US 8,666,329 B2

(45) Date of Patent: Mar. 4, 2014

(54) RADIO DEVICE

(75) Inventors: Toshiya Mitomo, Kawasaki (JP); Yukako Tsutsumi, Kawasaki (JP); Kentaro Taniguchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 74 days.

(21) Appl. No.: 13/372,208

(22) Filed: Feb. 13, 2012

(65) Prior Publication Data

US 2012/0142286 A1 Jun. 7, 2012

Related U.S. Application Data

(63) Continuation of application No. PCT/JP2009/066412, filed on Sep. 18, 2009.

(51) Int. Cl.
*H04B 1/44* (2006.01)

(52) U.S. Cl.
USPC ................................ 455/82; 327/593; 333/13

(58) Field of Classification Search
USPC ............................................................ 455/82
See application file for complete search history.

(56) References Cited

U.S. PATENT DOCUMENTS 6,009,314 A * 12/1999 Bjork et al. ..................... 455/83
6,735,418 B1 * 5/2004 MacNally et al. .............. 455/78
6,831,611 B2 12/2004 Ooe et al.
6,940,707 B2 * 9/2005 Nakatani et al. .............. 361/303
6,957,047 B1 * 10/2005 Young et al. ..................... 455/83
7,123,209 B1 * 10/2006 Desclos et al. ................ 343/860
7,187,330 B2 * 3/2007 Powell et al. .......... 343/700 MS
7,197,284 B2 * 3/2007 Brandt et al. ................... 455/78
7,292,827 B2 * 11/2007 McCorkle ........................ 455/78
7,403,170 B2 * 7/2008 Kanno et al. .................. 343/770
7,417,515 B2 * 8/2008 Chominski ................... 333/105
7,486,968 B2 * 2/2009 Aschermann .............. 455/562.1
7,532,172 B2 * 5/2009 Kanno .......................... 343/770
7,595,704 B2 * 9/2009 McKay et al. .................. 333/26

(Continued)

FOREIGN PATENT DOCUMENTS

JP 2001-326514 11/2001
JP 2003-243922 8/2003

(Continued)

OTHER PUBLICATIONS

International Preliminary Report on Patentability and Written Opinion issued by the International Bureau of WIPO on Apr. 11, 2012, for International Application No. PCT/JP2009/0066412.

(Continued)

*Primary Examiner* — Hai V Nguyen

(74) *Attorney, Agent, or Firm* — Finnegan, Henderson, Farabow, Garrett & Dunner, L.L.P.

(57) ABSTRACT

According to one embodiment, a radio device comprises a differential antenna that has a pair of differential power supply terminals, a transmitter that transmits a first signal via the differential antenna, a receiver that has a pair of differential input terminals and receives a second signal via the differential antenna, a first control unit, and a second control unit. The first control unit causes a signal conduction state between the differential antenna and the receiver when the receiver receives the second signal. The second control unit switches from a signal conduction state to a signal block state between one of the differential input terminals and one of the differential power supply terminals based on a reception state when the receiver receives the second signal.

5 Claims, 6 Drawing Sheets

(56) References Cited

U.S. PATENT DOCUMENTS

| | | | | |
|---|---|---|---|---|
| 7,701,252 | B1 * | 4/2010 | Chow et al. | 326/41 |
| 7,737,783 | B2 * | 6/2010 | Yamaguchi | 330/260 |
| 8,112,044 | B2 * | 2/2012 | Marholev et al. | 455/78 |
| 8,135,357 | B1 * | 3/2012 | Chang et al. | 455/83 |
| 8,232,850 | B2 * | 7/2012 | Rofougaran | 333/25 |
| 8,283,992 | B2 * | 10/2012 | McKay et al. | 333/26 |
| 8,331,968 | B2 * | 12/2012 | Choi et al. | 455/509 |
| 8,433,507 | B2 * | 4/2013 | Hannah et al. | 701/400 |
| 8,463,540 | B2 * | 6/2013 | Hannah et al. | 701/408 |
| 8,472,894 | B2 * | 6/2013 | Wang et al. | 455/107 |
| 8,482,676 | B2 * | 7/2013 | Hung | 348/725 |
| 2004/0009752 | A1 * | 1/2004 | Mohan | 455/78 |
| 2005/0075083 | A1 * | 4/2005 | Cairo | 455/120 |
| 2005/0107042 | A1 * | 5/2005 | De Graauw | 455/78 |
| 2007/0115801 | A1 * | 5/2007 | Li et al. | 370/208 |
| 2007/0262829 | A1 * | 11/2007 | Chominski | 333/103 |
| 2008/0284671 | A1 * | 11/2008 | Kanno | 343/767 |
| 2009/0002250 | A1 * | 1/2009 | Kanno | 343/770 |
| 2009/0052559 | A1 * | 2/2009 | Iwasaki | 375/257 |
| 2009/0195312 | A1 * | 8/2009 | Yamaguchi | 330/260 |
| 2009/0318092 | A1 * | 12/2009 | Maoz et al. | 455/73 |
| 2011/0065383 | A1 * | 3/2011 | Frankland et al. | 455/41.1 |
| 2012/0028574 | A1 * | 2/2012 | Bangs et al. | 455/41.1 |
| 2013/0189926 | A1 * | 7/2013 | Bangs et al. | 455/41.1 |
| 2013/0214502 | A1 * | 8/2013 | Hannah et al. | 280/33.994 |

FOREIGN PATENT DOCUMENTS

| | | |
|---|---|---|
| JP | 2005-065010 | 3/2005 |
| JP | 2005-160026 | 6/2005 |
| JP | 2005-516525 | 6/2005 |
| JP | 2006-268627 | 10/2006 |
| JP | 2007-081709 | 3/2007 |
| JP | 2008-017012 | 1/2008 |
| JP | 2008-026035 | 2/2008 |
| JP | 4177888 | 8/2008 |

OTHER PUBLICATIONS

English-language translation of International Search Report from the Japanese Patent Office for International Application No. PCT/JP2009/066412, mailing date Jan. 19, 2010.

Notification of Reason for Rejection issued by the Japanese Patent Office on Aug. 20, 2013, for Japanese Patent Application No. 2011-531732, and English-language translation thereof.

* cited by examiner

RADIO DEVICE

CROSS REFERENCE TO RELATED APPLICATIONS

This application is based on the International Application No. PCT/JP2009/066412, filed on Sep. 18, 2009, the entire contents of which are incorporated herein by reference.

FIELD

Embodiments described herein relate generally to a radio device.

BACKGROUND

In recent years, a wireless data transmitting technique that uses an antenna coil to wirelessly transmit a power in a non-contact manner has been used in many devices such as an IC card and a cell phone. In a receiver including an antenna coil, a reception null point occurs due to a change in propagation environment, which deteriorates a reception property. In order to prevent the null point from occurring, there is proposed a method for improving the reception property by changing a device value of a device connected to the antenna coil.

However, when the method is applied to a radio device in which an antenna is shared between a transmitter and a receiver, there is a problem that a signal is leaked in transmission and reception, which deteriorates transmission/reception properties.

DETAILED DESCRIPTION

According to one embodiment, a radio device comprises a differential antenna that has a pair of differential power supply terminals, a transmitter that transmits a first signal via the differential antenna, a receiver that has a pair of differential input terminals and receives a second signal via the differential antenna, a first control unit, and a second control unit. The first control unit causes a signal conduction state between the differential antenna and the receiver when the receiver receives the second signal. The second control unit switches from a signal conduction state to a signal block state between one of the differential input terminals and one of the differential power supply terminals based on a reception state when the receiver receives the second signal.

Embodiments will now be explained with reference to the accompanying drawings.

First Embodiment

Figure 1:
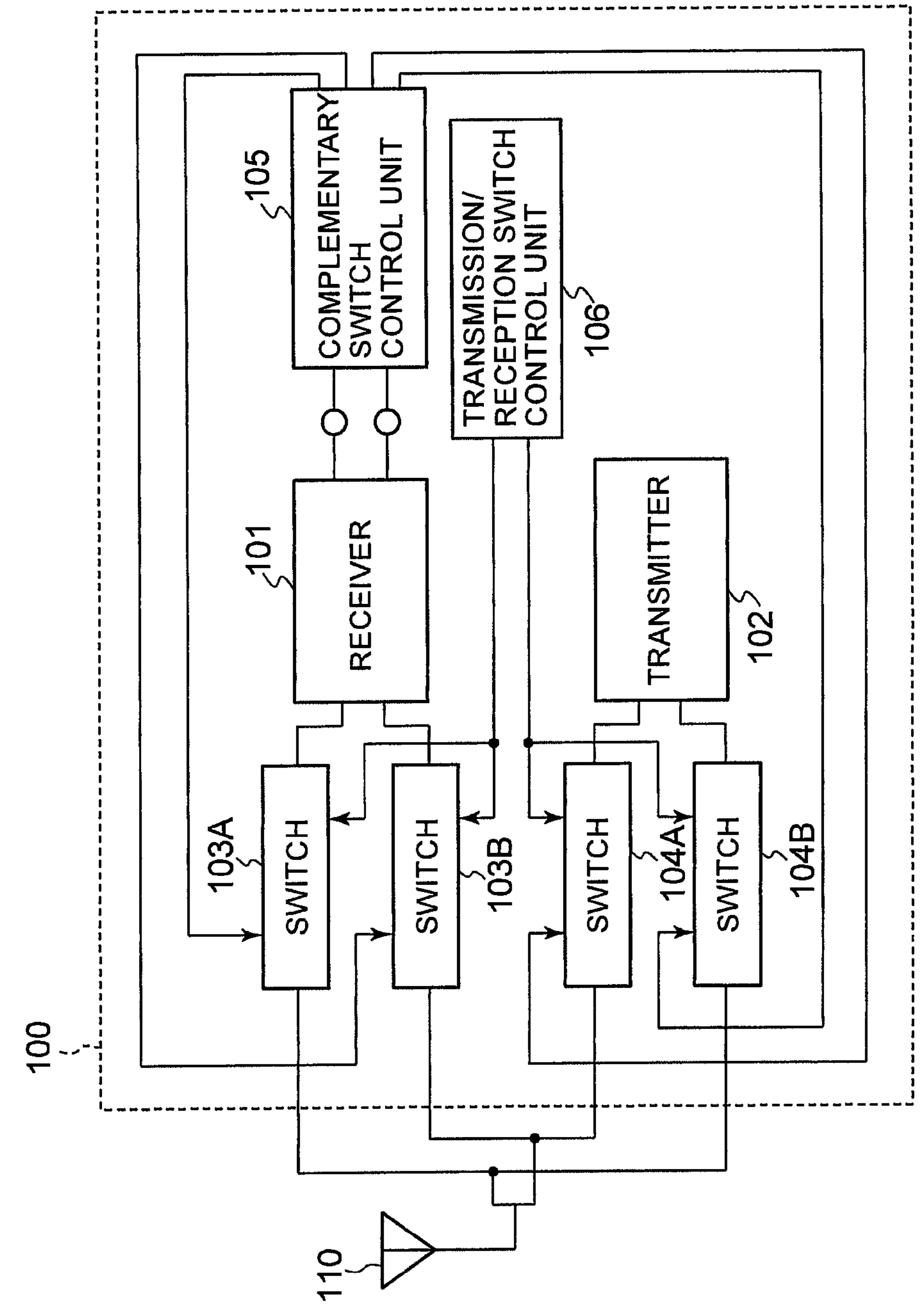
FIG. 1 is a block diagram showing a radio device according to a first embodiment.

FIG. 1 shows a schematic structure of a radio device according to a first embodiment of the present invention. A radio device 100 includes a receiver 101, a transmitter 102, switches 103A, 103B, 104A, 104B, a complementary switch control unit 105 and a transmission/reception switch control unit 106. The receiver 101 has a pair of differential input terminals and receives a differential input signal via the switches 103A, 103B and a pair of differential power supply terminals in a differential antenna 110. The transmitter 102 has a pair of differential output terminals and transmits a differential output signal via the switches 104A, 104B and the pair of differential power supply terminals in the differential antenna 110. The receiver 101 and the transmitter 102 share the differential antenna 110.

The complementary switch control unit 105 can separately switch the switches 103A, 103B, 104A and 104B between a signal conduction state (conduction state) and a signal block state (block state).

The transmission/reception switch control unit 106 can switch the switches 103A, 103B, 104A and 104B between the conduction state and the block state. When putting the switches 103A and 103B in the conduction state, the transmission/reception switch control unit 106 puts the switches 104A and 104B in the block state. When putting the switches 103A and 103B in the block state, the transmission/reception switch control unit 106 puts the switches 104A and 104B in the conduction state.

When the radio device 100 transmits a signal, the transmission/reception switch control unit 106 puts the switches 103A and 103B in the block state and puts the switches 104A and 104B in the conduction state. The signal output from the transmitter 102 is supplied to the differential antenna 110 without being leaked to the receiver 101, thereby preventing a deterioration in the transmission property.

When the radio device 100 receives a signal, the transmission/reception switch control unit 106 puts the switches 103A and 103B in the conduction state and puts the switches 104A and 104B in the block state. The signal input from the differential antenna 110 is supplied to the receiver 101 without being leaked to the transmitter 102, thereby preventing a deterioration in the reception property.

While the radio device 100 is receiving a signal, if a null point occurs due to a change in propagation environment and the reception state is deteriorated, the receiver 101 notifies the complementary switch control unit 106 of the deteriorated reception state. When receiving the notification, the complementary switch control unit 106 inverts the operation state of either one of the switches 103A and 103B. In other words, the complementary switch control unit 106 puts the switch 103A or 103B in the block state.

Figure 2:
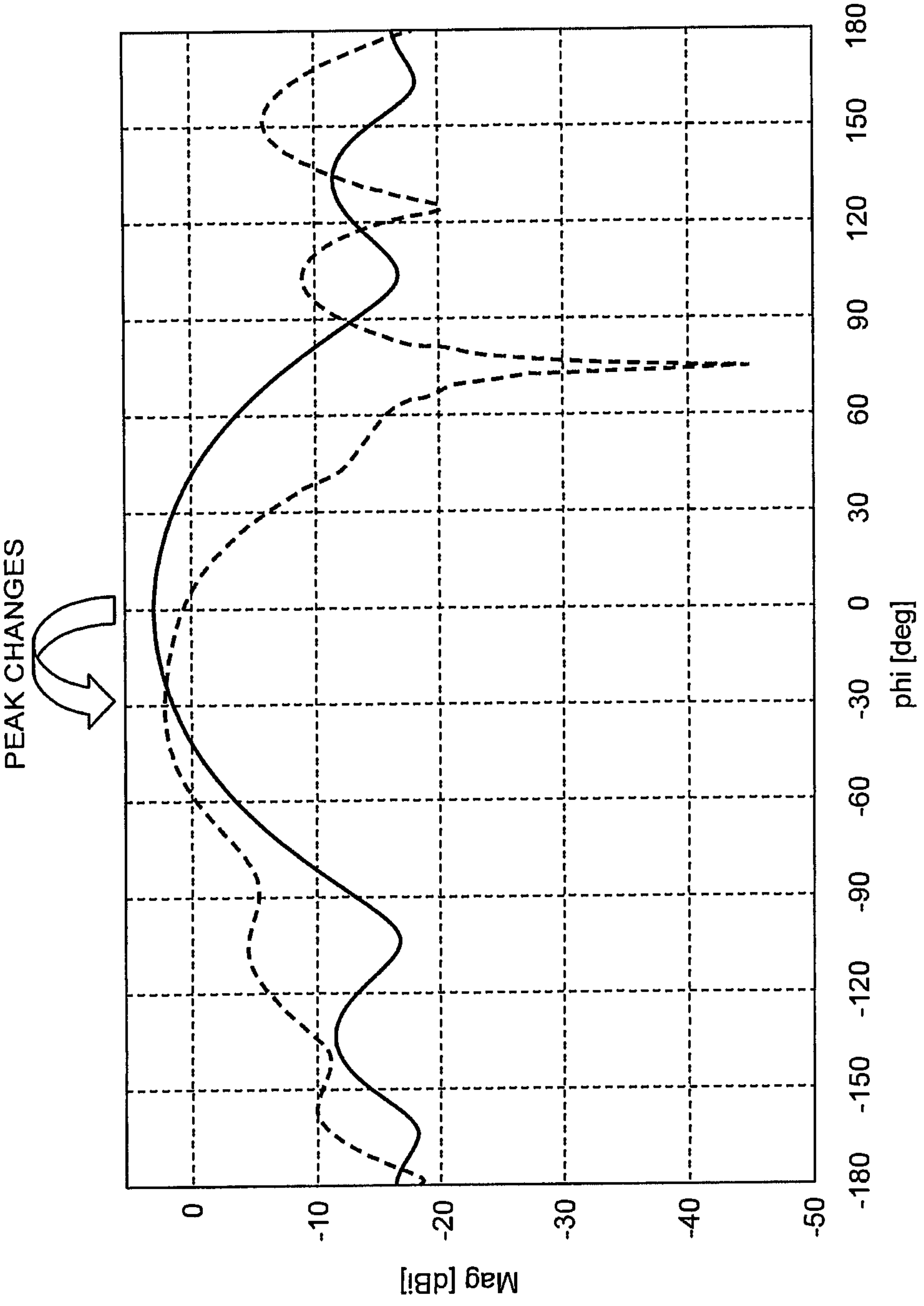
FIG. 2 is a diagram showing an exemplary change in antenna radiation pattern.

The operation state of the switch 103A or 103B is changed and thus a radiation pattern of the differential antenna 110 is changed. An exemplary change in the radiation pattern is shown in FIG. 2. In FIG. 2, the solid line indicates the case in which both the switches 103A and 103B are in the conduction state and the broken line indicates the case in which one of the switches 103A and 103B is in the block state. It can be seen from the figure that an angle at which the reception power reaches the peak changes.

The operation state of the switches 103A and 103B is appropriately changed so that the reception state changes to weaken an influence of the null point, thereby preventing the deterioration in the reception property.

In this way, in the present embodiment, since the leak of the transmission signal to the reception side and the leak of the reception signal to the transmission side are prevented and further the operation state of the switches 103A and 103B is changed thereby to change the antenna radiation pattern, thereby weakening the influence of the null point, the deteriorations in the transmission/reception properties can be prevented and the antenna can be shared between the transmitter and the receiver.

In the above embodiment, the switching of the operation state of the switches may be complementary switching of the switches 104A, 104B at the transmitter 102 side or complementary switching between the differential terminals in the total switches at the receiver 101 side and at the transmitter 102 side.

In the above embodiment, the complementary switch control unit 105 may have the function of the transmission/reception switch control unit 106.

Second Embodiment

Figure 3:
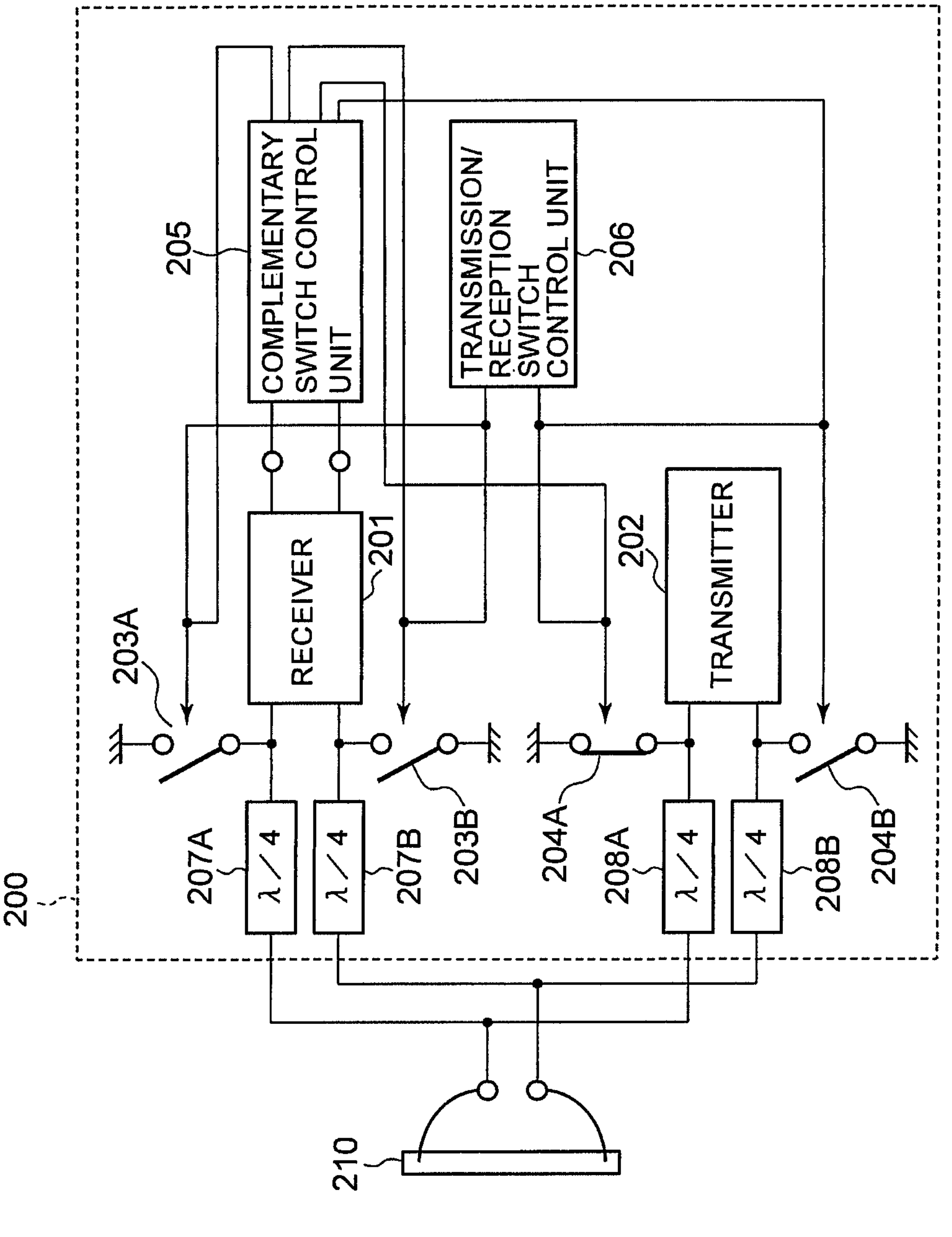
FIG. 3 is a block diagram showing a radio device according to a second embodiment.

FIG. 3 shows a schematic structure of a radio device according to a second embodiment of the present invention. A radio device 200 includes a receiver 201, a transmitter 202, switches 203A, 203B, 204A, 204B, a complementary switch control unit 205, a transmission/reception switch control unit 206 and transmission lines 207A, 207B, 208A, 208B.

The receiver 201 receives a differential input signal via the transmission lines 207A, 207B and a differential power supply loop antenna 210. The transmitter 202 transmits a differential output signal via the transmission lines 208A, 208B and the differential power supply loop antenna 210. The receiver 201 and the transmitter 202 share the differential power supply loop antenna 210.

The switch 203A is grounded at one end and is connected at the other end between the transmission line 207A and the receiver 201. The switch 203B is grounded at one end and is connected at the other end between the transmission line 207B and the receiver 201. The switch 204A is grounded at one end and is connected at the other end between the transmission line 208A and the transmitter 202. The switch 204B is grounded at one end and is connected at the other end between the transmission line 208B and the transmitter 202.

The complementary switch control unit 205 can separately switch on or off the switches 203A, 203B, 204A and 204B.

The transmission/reception switch control unit 206 can switch on or off the switches 203A, 203B, 204A and 204B. When powering off the switches 203A and 203B, the transmission/reception switch control unit 206 powers on the switches 204A and 204B. When powering on the switches 203A and 203B, the transmission/reception switch control unit 206 powers off the switches 204A and 204B.

The transmission lines 207A, 207B, 208A and 208B have an electric length of ¼ wavelengths in the transmission/reception bands.

When the radio device 200 transmits a signal, the transmission/reception switch control unit 206 powers on the switches 203A and 203B and powers off the switches 204A and 204B. Thereby, a reception side path assumed by the differential power supply loop antenna 210 is connected to a ground terminal via the ¼-wavelength transmission lines 207A, 207B and the conducted switches 203A, 203B. Therefore, a short stub having ¼ wavelengths is caused and an impedance is remarkably (infinitely) increased. The signal output from the transmitter 202 is supplied to the differential power supply loop antenna 210 without being leaked to the receiver 201, thereby preventing the deterioration in the transmission property.

When the radio device 200 receives a signal, the transmission/reception switch control unit 206 powers off the switches 203A and 203B and powers on the switches 204A and 204B. Thereby, a transmission side path assumed by the differential power supply loop antenna 210 is connected to a ground terminal via the ¼-wavelength transmission lines 208A, 208B and the conducted switches 204A, 204B. Therefore, a short stub having ¼ wavelengths is caused and an impedance is remarkably (infinitely) increased. The signal input from the differential power supply loop antenna 210 is supplied to the receiver 201 without being leaked to the transmitter 202, thereby preventing the deterioration in the reception property.

While the radio device 200 is receiving a signal, when a null point occurs due to a change in propagation environment and the reception state deteriorates, the receiver 201 notifies the complementary switch control unit 206 of the deteriorated reception state. When receiving the notification, the complementary switch control unit 205 inverts the operation state of either one of the switches 203A and 203B. In other words, the complementary switch control unit 206 powers on the switch 203A or 2036.

Thereby, the radiation pattern of the differential power supply loop antenna 210 changes similar to the first embodiment described with reference to FIG. 2. Thus, the reception state changes to weaken the influence of the null point, thereby preventing the deterioration in the reception property.

In this way, in the present embodiment, since the leak of the transmission signal to the reception side and the leak of the reception signal to the transmission side are prevented and further the operation state of the switches 203A and 203B is changed thereby to change the antenna radiation pattern, thereby weakening the influence of the null point, the deteriorations in the transmission/reception properties can be prevented and the antenna can be shared between the transmitter and the receiver.

In the second embodiment, the switching of the operation state of the switches may be complementary switching of the switches 204A and 204B at the transmitter 202 side or complementary switching between the differential terminals in the total switches at the receiver 201 side and at the transmitter 202 side.

In the second embodiment, the switch device formed of the switches 203A, 203B, 204A, 204B and the ¼-wavelength transmission lines 207A, 207B, 208A, 208B may be configured of another device capable of obtaining an equivalent capability. The differential power supply loop antenna 210 may be other differential antenna capable of obtaining an equivalent capability.

Third Embodiment

Figure 4:
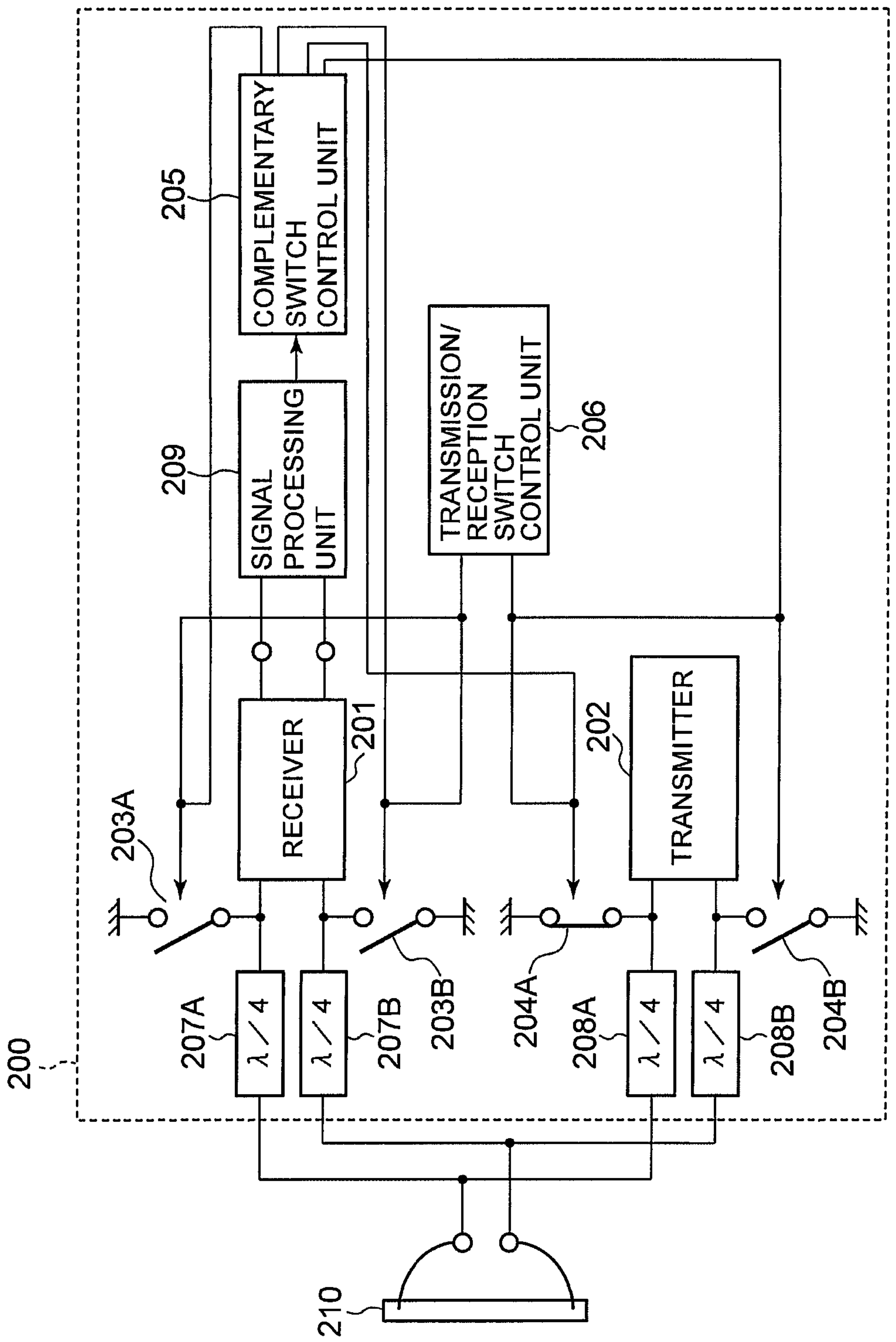
FIG. 4 is a block diagram showing a radio device according to a third embodiment.

FIG. 4 shows a schematic structure of a radio device according to a third embodiment of the present invention. The radio device according to the present embodiment is such that the radio device 200 according to the second embodiment shown in FIG. 3 is further provided with a signal processing unit 209. In FIG. 4, like reference numerals are denoted to like reference parts identical to those in the second embodiment shown in FIG. 3.

The signal processing unit 209 measures a spectrum in a signal band of the reception signal by the receiver 201 through fast Fourier transformation (FFT).

The present embodiment is different from the second embodiment in the operation when a null point occurs due to a change in propagation environment and the reception state deteriorates while the radio device 200 is receiving a signal. At this time, the receiver 201 notifies the complementary switch control unit 205 of the deteriorated reception state via the signal processing unit 209 (or directly not via the signal processing unit 209).

The complementary switch control unit 205 switches the operation state of the switches 203A, 203B based on the notification. The signal processing unit 209 measures a spectrum of the reception signal per operation state of the switches 203A, 203B, and outputs the measurement result to the complementary switch control unit 205. The complementary switch control unit 205 specifies an operation state of the switches 203A, 203B in which null points (notches) are less and the antenna radiation pattern indicates the flattest frequency property, and sets the operation state.

In this way, the present embodiment can specify the operation state of the switches for a preferable antenna radiation pattern, thereby more effectively preventing the deterioration in the reception property.

The signal processing of the signal processing unit 209 may employ a RSSI (Received Signal Strength Indicator) measurement value. In this case, an antenna radiation pattern for which a less-fallen and stable RSSI measurement value can be obtained is selected by the complementary switch control unit 205.

The signal processing of the signal processing unit 209 may employ an error detection result. An antenna radiation pattern having less detected errors is selected by the complementary switch control unit 205 by use of the result of CRC (Cyclic Redundancy Check) for the reception signal.

The signal processing of the signal processing unit 209 may employ a pilot signal. Since a well-known pilot signal is used at the reception side, an antenna radiation pattern capable of correctly receiving the pilot signal is selected by the complementary switch control unit 205.

In the third embodiment, the switching of the operation state of the switches may be complementary switching of the switches 204A, 204B at the transmitter 202 side or complementary switching between the differential terminals in the total switches at the receiver 201 side and at the transmitter 202 side. For example, in the complementary switching in the total switches, the complementary switch control unit 205 switches on or off each of the switches 203A, 203B, 204A and 204B. A switch operation state in which the antenna radiation pattern is most preferable is specified and set from among the 16 ($=2^4$) switch operation states.

Fourth Embodiment

Figure 5:
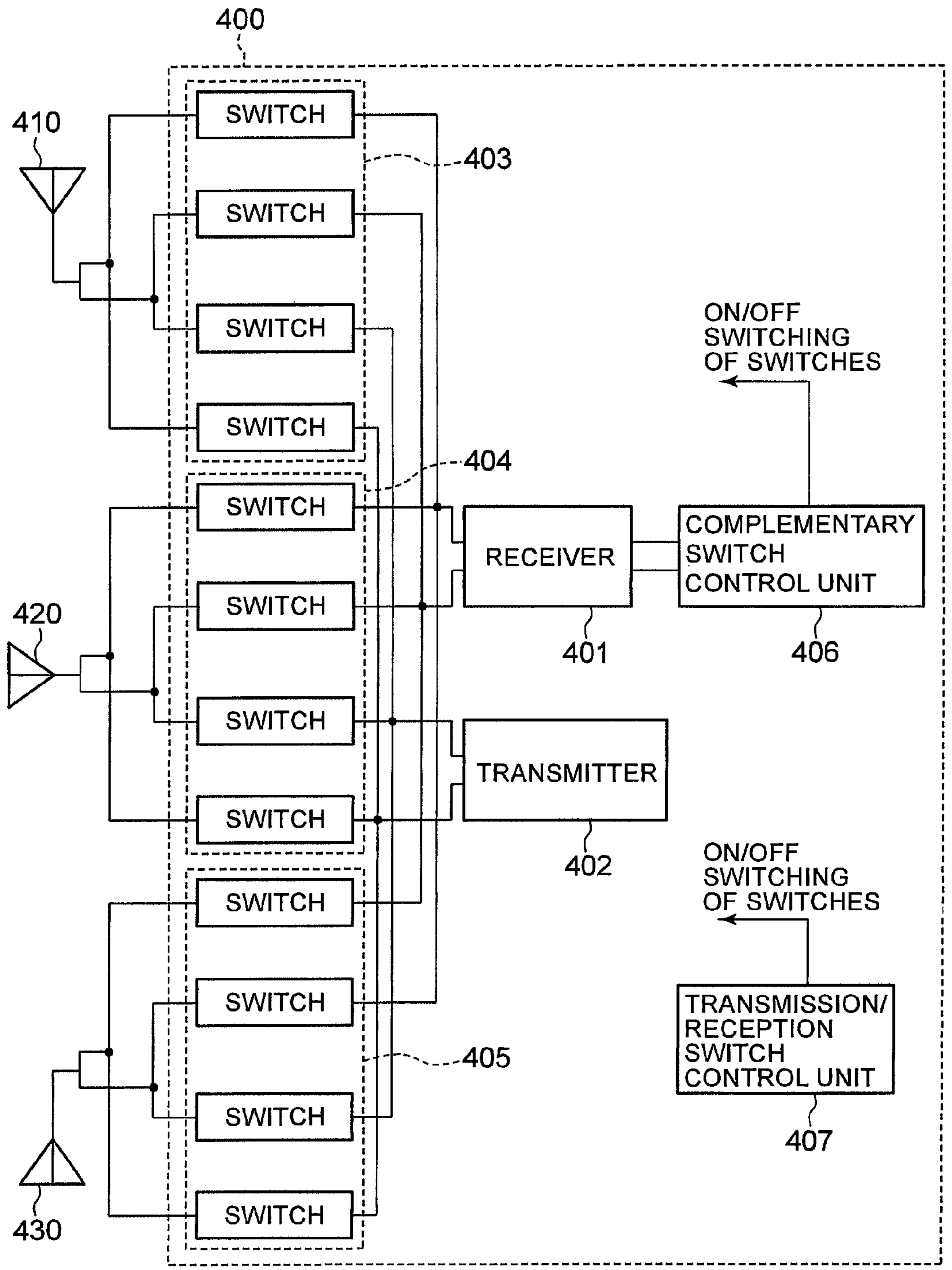
FIG. 5 is a block diagram showing a radio device according to a fourth embodiment.

FIG. 5 shows a schematic structure of a radio device according to a fourth embodiment of the present invention. A radio device 400 includes a receiver 401, a transmitter 402, switch groups 403, 404, 405, a complementary switch control unit 406, and a transmission/reception switch control unit 407.

The receiver 401 receives a differential input signal via the switch groups 403, 404, 405 and differential antennas 410, 420, 430. The transmitter 402 transmits a differential output signal via the switch groups 403, 404, 405 and the differential antennas 410, 402, 430. The receiver 401 and the transmitter 402 share the differential antennas 410, 420, 430. Each antenna is directed in a different direction and can transmit and receive a signal at a wide range of angles.

Three transmission/reception systems formed of the switch groups and the differential antennas are present. Each system has a similar structure to the switches 103A, 103B, 104A, 104B and the differential antenna 110 according to the first embodiment shown in FIG. 1.

The complementary switch control unit 406 and the transmission/reception switch control unit 407 can switch (on/off) the operation state of the switches included in the switch groups 403, 404, 405 like the complementary switch control unit 105 and the transmission/reception switch control unit 106 according to the first embodiment, respectively.

When the radio device 400 receives a signal, any one system of the three systems is selected. There will be described herein a case in which the differential antenna 410 and the switch group 403 are selected.

The transmission/reception switch control unit 407 puts the switches which belong to the switch group 403 in the selected system and are connected to the receiver 401 in the conduction state, and puts the switches which belong to the switch group 403 in the selected system and are connected to the transmitter 402 and the switches which belong to the switch groups 404, 405 in the unselected systems in the block state.

Thereby, the signal input from the differential antenna 410 in the selected system is supplied to the receiver 401 without being leaked to the transmitter 402 and the differential antennas 420, 430 in the unselected systems.

In the reception state, when a null point occurs due to a change in propagation environment and the reception state deteriorates, the complementary switch control unit 406 inverts the operation state of either one of the switches which belong to the switch group 403 in the selected system and are connected to the receiver 401.

Consequently, the radiation pattern of the differential antenna 410 in the selected system is changed similar to the example shown in FIG. 2, and the reception state changes, thereby weakening the influence of the null point.

A system to be selected is switched and the radiation pattern is changed in each system so that more radiation patterns are provided, thereby enhancing the reception property.

As described above, since the present embodiment is such that the operation state of the switches are changed thereby to change the antenna radiation pattern per system, thereby weakening the influence of the null point, the deteriorations in the transmission/reception properties can be prevented and a plurality of antennas can be shared between the transmitter and the receiver.

The switching of the switches by the complementary switch control unit 406 may be complementary switching of the switches which belong to the switch group 403 and are connected to the transmitter 402 or complementary switching between the differential terminals in the total switches at the receiver 401 side and at the transmitter 402 side.

There have been described in the fourth embodiment the three systems formed of the switch groups and the differential antennas, but an arbitrary number of systems can be applied.

Fifth Embodiment

Figure 6:
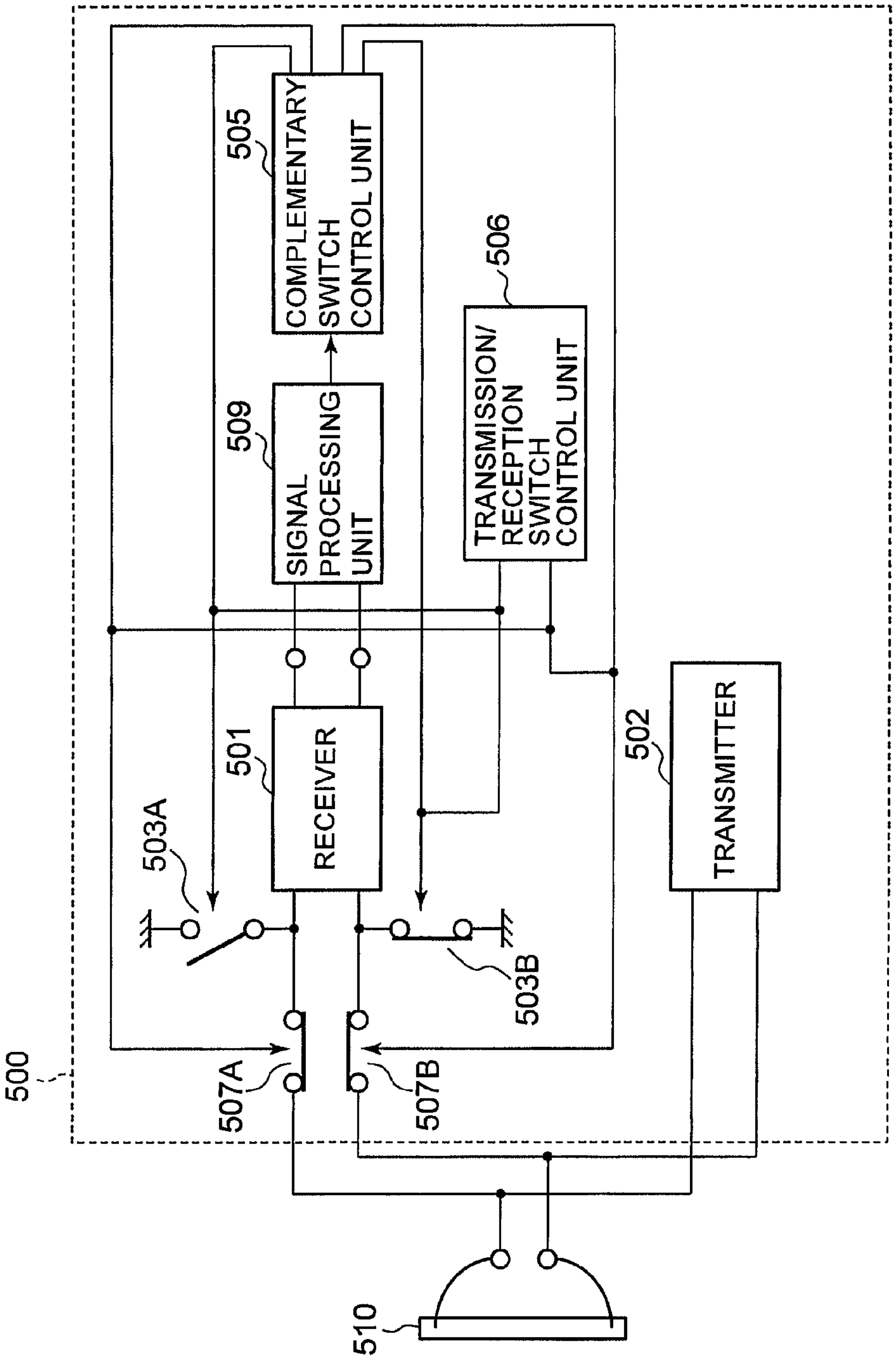
FIG. 6 is a block diagram showing a radio device according to a fifth embodiment.

FIG. 6 shows a schematic structure of a radio device according to a fifth embodiment of the present invention. A radio device 500 includes a receiver 501, a transmitter 502, switches 503A, 503B, a complementary switch control unit 505, a transmission/reception switch control unit 506, switches 507A, 507B, and a signal processing unit 509.

The radio device 500 is configured such that the switches 204A, 204B and the transmission lines 208A, 208B at the transmitter 202 side in the radio device 200 according to the third embodiment shown in FIG. 4 are omitted and the transmission lines 207A, 207B are replaced with the switches 507A, 507B.

The receiver 501, the transmitter 502, the switches 503A, 503B, the complementary switch control unit 505, the transmission/reception switch control unit 506 and the signal processing unit 509 correspond to the receiver 201, the transmitter 202, the switches 203A, 203B, the complementary switch control unit 205, the transmission/reception switch control unit 206, and the signal pressing unit 209 in FIG. 4, respectively. The complementary switch control unit 505 can switch on or off the switches 507A and 507B.

When the radio device 500 transmits a signal, the transmission/reception switch control unit 506 powers on the switches 503A, 503B and powers off the switches 507A, 507B. Thereby, the signal output from the transmitter 502 is supplied to a differential power supply loop antenna 510 without being leaked to the receiver 501 and the transmission signal is output from the antenna at a maximum, thereby preventing the deterioration in the transmission property.

When the radio device 500 receives a signal, the transmission/reception switch control unit 506 powers off the switches 503A, 503B connected to the input differential terminals of the receiver 501 in parallel and powers on the switches 507A, 507B connected to the input differential terminals of the receiver 501 in series. At this time, the transmitter 502 is in the non-operation state, its DC current is shut, and an output impedance is largely different from that at the operation. An impedance match cannot be established for the differential power supply loop antenna 510 and the leak of the signal from the antenna is minimum. Thus, even when a switch is not provided at the transmitter 502 side, the deterioration in the reception property can be prevented.

While the radio device 500 is receiving a signal, when a null point occurs due to a change in propagation environment and the reception state deteriorates, the receiver 501 notifies the complementary switch control unit 505 of the deteriorated reception state via the signal processing unit 509 (or directly not via the signal processing unit 509).

The complementary switch control unit 505 switches the operation state of the switches 503A, 503B based on the notification. Thereby, the radiation pattern of the differential power supply loop antenna 510 changes similar to the first embodiment described with reference to FIG. 2.

The signal processing unit 509 measures a spectrum of the reception signal per operation state of the switches 503A, 503B, and outputs the measurement result to the complementary switch control unit 505. The complementary switch control unit 505 specifies an operation state of the switches 503A, 503B in which null points (notches) are less and the antenna radiation pattern indicates the flattest frequency property, and sets the operation state.

In this way, since the present embodiment is such that the operation state of the switches 503A, 503B is changed thereby to change the antenna radiation pattern, thereby weakening the influence of the null point, the deteriorations in the transmission/reception properties can be prevented and the antenna can be shared between the transmitter and the receiver. Further, the operation state of the switches in which a preferable antenna radiation pattern is obtained can be specified, thereby more effectively preventing the deterioration in the reception property.

In the fifth embodiment, the switching of the operation state of the switches by the complementary switch control unit 505 may be the opening of either one of the differential signals by complementary switching of the switches 507A, 507B, or complementary switching between the differential terminals in all the switches 503A, 503B, 507A, 507B.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A radio device comprising:

a differential antenna that has a pair of differential power supply terminals;

a transmitter that transmits a first signal via the differential antenna;

a receiver that has a pair of differential input terminals and receives a second signal via the differential antenna;

a first switch unit that switches a signal conduction state and a signal block state between one of the differential input terminals and one of the differential power supply terminals;

a second switch unit that switches a signal conduction state and a signal block state between the other of the differential input terminals and the other of the differential power supply terminals;

a first control unit that controls the first switch unit and the second switch unit such that the signal block state is caused when the transmitter transmits the first signal; and a second control unit that switches either the first switch unit or the second switch unit from the signal conduction state to the signal block state when the second signal is being received.

2. The radio device according to claim 1, wherein the first switch unit and the second switch unit respectively have:

a first switch that is connected at one end to the differential input terminal and is connected at the other end to the differential power supply terminal; and a second switch that is connected at one end to a connection point between the differential input terminal and one end of the first switch and is grounded at the other end, wherein the first control unit powers off the first switch and powers on the second switch when the transmitter transmits the first signal, and powers on the first switch and powers off the second switch when the receiver receives the second signal, and the second control unit inverts ON/OFF of either the first switch or the second switch in the first switch unit and the second switch unit based on the second signal received by the receiver.

3. The radio device according to claim 2, further comprising a signal processing unit that measures a spectrum of the second signal received by the receiver, wherein the second control unit determines whether to power on or off the first switch and the second switch in the first switch unit and the second switch unit based on the measurement result of the signal processing unit.

4. The radio device according to claim 1, comprising a plurality of transmission/reception systems including the differential antenna, the first switch unit and the second switch unit, wherein when the receiver receives the second signal, the first control unit puts the first switch unit and the second switch unit in the same transmission/reception system as the differential antenna used for receiving the second signal in the signal conduction state, and puts the first switch unit and the second switch unit in the same transmission/reception system as the differential antenna not used for receiving the second signal in the signal block state.

5. The radio device according to claim 1, further comprising:

a third switch unit that switches a signal conduction/block state between one of a pair of differential output terminals provided in the transmitter and one of the differential power supply terminals; and a fourth switch unit that switches a signal conduction/block state between the other of the differential output terminals and the other of the differential power supply terminals, wherein the first control unit controls the third switch unit and the fourth switch unit such that the signal conduction state is caused when the first signal is to be transmitted and the signal block state is caused when the second signal is to be received.

* * * * *